United States Patent
Singh et al.

(10) Patent No.: US 10,693,628 B2
(45) Date of Patent: Jun. 23, 2020

(54) ENABLING DISTANCE-BASED OPERATIONS ON DATA ENCRYPTED USING A HOMOMORPHIC ENCRYPTION SCHEME WITH INEFFICIENT DECRYPTION

(71) Applicant: International Business Machines Corporation, Armonk, NY (US)

(72) Inventors: Gagandeep Singh, Bangalore (IN); Akshar Kaul, Bangalore (IN); Manish Kesarwani, Bangalore (IN); Sameep Mehta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 15/971,230

(22) Filed: May 4, 2018

(65) Prior Publication Data
US 2019/0342069 A1    Nov. 7, 2019

(51) Int. Cl.
*G06F 21/00*       (2013.01)
*H04L 9/00*        (2006.01)
(Continued)

(52) U.S. Cl.
CPC .......... *H04L 9/008* (2013.01); *G06F 21/6218* (2013.01); *G06K 9/6248* (2013.01); *H04L 9/0618* (2013.01)

(58) Field of Classification Search
CPC ... G06F 21/6218; G06K 9/6248; H04L 9/008; H04L 9/0618
See application file for complete search history.

(56) References Cited

U.S. PATENT DOCUMENTS 9,252,954 B2   2/2016   Halevi et al.
9,608,817 B2   3/2017   Gentry et al.
(Continued)

FOREIGN PATENT DOCUMENTS

WO    2017177313 A1    10/2017

OTHER PUBLICATIONS

Doroz, Y., New Approaches for Efficient Fully Homomorphic Encryption, Worcester Polytechnic Institute, 2017.
(Continued)

*Primary Examiner* — Joseph P Hirl
*Assistant Examiner* — Ka Shan Choy
(74) *Attorney, Agent, or Firm* — Ryan, Mason & Lewis, LLP

(57) ABSTRACT

Methods, systems, and computer program products for enabling distance-based algorithms on data encrypted using a 2DNF homomorphic encryption scheme with inefficient decryption are provided herein. A computer-implemented method includes generating multiple versions of a data point, wherein each of the multiple versions of the data point comprises a distinct value corresponding to a distinct Euclidean space; encrypting each of the multiple versions of the data point; storing the multiple encrypted versions of the data point across multiple databases; and executing one or more distance-based algorithms on the multiple encrypted versions of the data point by using a finite decryption table across the multiple databases, wherein the finite decryption table stores a set of plaintext-ciphertext mappings between (i) multiple plaintext values and (ii) multiple encrypted ciphertext values corresponding to the multiple plaintext values.

20 Claims, 7 Drawing Sheets

(51) Int. Cl.
  *H04L 9/06*   (2006.01)
  *G06K 9/62*   (2006.01)
  *G06F 21/62*  (2013.01)

(56) References Cited

U.S. PATENT DOCUMENTS

| | | |
|---|---|---|
| 9,716,590 B2 | 7/2017 | Gentry |
| 2016/0156460 A1* | 6/2016 | Feng .................. H04L 9/008 713/168 |
| 2016/0344707 A1* | 11/2016 | Philipp ............... H04L 67/1097 |

OTHER PUBLICATIONS

Boneh et al., "Evaluating 2-DNF Formulas on Ciphertexts," Apr. 2, 2006.
Bost et al., Machine Learning Classification over Encrypted Data, NDSS 2015.
Elmehdwi et al., Secure k-nearest neighbor query over encrypted data in outsourced environments, ICDE, 2014.
Zhu et al., Secure k-nn computation on encrypted cloud data without sharing key with query users, Proceedings of the 2013 international workshop on Security in cloud computing. ACM, 2013.
Yao et al., Secure nearest neighbor revisited, ICDE, 2013.

\* cited by examiner

ENABLING DISTANCE-BASED OPERATIONS ON DATA ENCRYPTED USING A HOMOMORPHIC ENCRYPTION SCHEME WITH INEFFICIENT DECRYPTION

FIELD

The present application generally relates to information technology, and, more particularly, to storage techniques for encrypted data.

BACKGROUND

Conventional encryption schemes can include disjunctive normal form (2DNF) homomorphic encryption schemes, wherein the scheme provides a procedure to evaluate the encryption of a 2DNF formula from encrypted cipher text values of the formula inputs. As detailed herein, 2DNF formulas are DNF formulas wherein each clause contains at most two literals (that is, a 2DNF formula is the sum of products wherein each product is a maximum of two terms). 2DNF formulas can be represented, for example, via the form $(a_1+a_2+a_3)(b_1+b_2)+(c_1+c_2+c_3+c_4)(d_1)+\ldots$.

The decryption algorithm associated with a few such encryption schemes, however, is slow and inefficient. Accordingly, as an alternative technique, some conventional approaches include constructing a decryption table that maps encrypted values to plaintext values. However, the usage of a decryption table limits the decryption domain to a small sub-set of the encrypted values.

SUMMARY

In one embodiment of the present invention, techniques for enabling distance-based operations on data encrypted using a 2DNF homomorphic encryption scheme with inefficient decryption are provided. An exemplary computer-implemented method can include generating multiple versions of a data point, wherein each of the multiple versions of the data point comprises a distinct value corresponding to a distinct Euclidean space; encrypting each of the multiple versions of the data point; storing the multiple encrypted versions of the data point across multiple databases; and executing one or more distance-based algorithms on the multiple encrypted versions of the data point by using a finite decryption table across the multiple databases, wherein the finite decryption table stores a set of plaintext-ciphertext mappings between (i) multiple plaintext values and (ii) multiple encrypted ciphertext values corresponding to the multiple plaintext values.

In another embodiment of the invention, an exemplary computer-implemented method can also include generating a storage mechanism comprising multiple databases, wherein the storage mechanism is compatible with disjunctive normal form homomorphic semantically secure encryption (2DNF-sHE) schemes.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
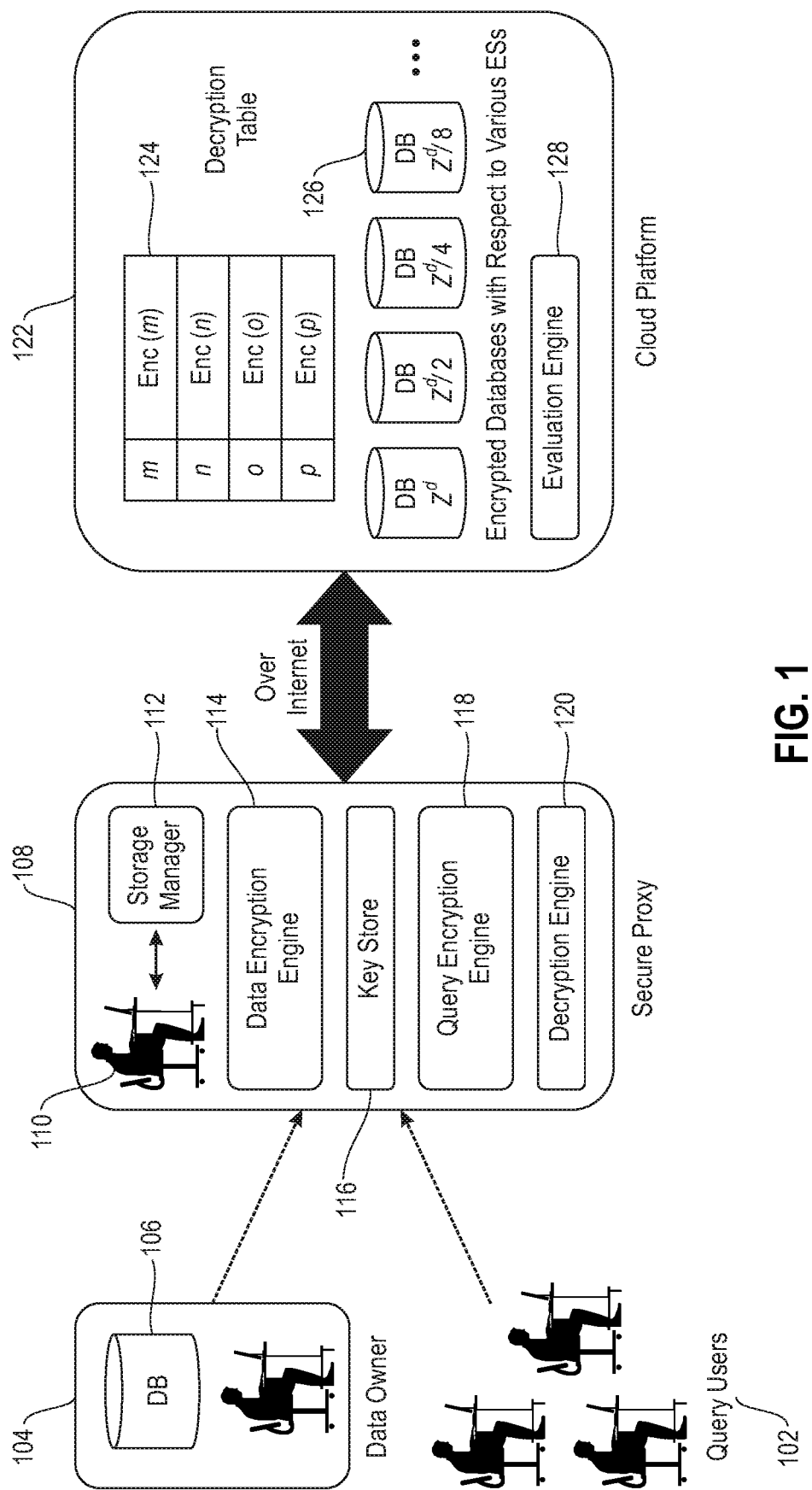
FIG. 1 is a diagram illustrating system architecture, according to an exemplary embodiment of the invention.

As described herein, an embodiment of the present invention includes enabling distance-based operations on data encrypted using a 2DNF homomorphic encryption scheme with inefficient decryption. At least one embodiment of the invention can include changing a data organization mechanism to support distance-based analytics such as the k-nearest neighbors (kNN) algorithm, k-means clustering, etc.

Accordingly, one or more embodiments of the invention can include performing distance-based analytics using 2DNF-sHE (homomorphic semantically secure encryption) schemes to store encrypted data multiple times in multiple databases. Such an embodiment can include storing encrypted data multiple times in multiple databases such that the same data point is stored with respect to multiple Euclidean spaces in multiple tables. As such, at least one embodiment of the invention includes storing the same item of data multiple times, and in each subsequent copy of the item of data, the value is changed from a finer-grained to a coarser-grained Euclidean space. This can be carried out, for example, by dividing the value by two (merely as an example). Each of these values can then be encrypted (for example, with the 2DNF-sHE cryptosystem/encryption scheme) and the cipher text can be stored across one or more (potentially distrusted) servers.

Additionally, at least one embodiment of the invention can include using a finite decryption table across multiple databases to store a mapping of plaintext values and their corresponding encryptions for facilitating distance-based analytical queries. Such an embodiment can include using, for example, one or more cryptosystems which support computation of a second-degree polynomial in the cipher text domain and which include one or more expensive decryption algorithms (such as, for example, BGN). As used herein, "expensive" indicates that the execution time of the decryption algorithm is high.

By way merely of illustration, consider an example kNN scheme using a 2DNF homomorphic encryption scheme, wherein the system entities include a data owner (a trusted entity), one or more clients, and multiple clouds. For the purposes of this illustration, assume the existence of two non-colluding clouds (say, Cloud1 and Cloud2), such that information trusted with one cloud is not shared with the other cloud.

Computation of kNN, in this example, can be carried out as follows. Cloud1 computes an encrypted squared Euclidean distance ($D^2$) for each encrypted data point (which is stored at the cloud) with respect to encrypted query point (q) (which is sent by the query users) in 2DNF-sHE cipher text form. Subsequently, Cloud1 sends the $D^2$ computations to Cloud2, and Cloud2 decrypts the encrypted $D^2$ terms and returns row identifiers (ID)s of the smallest k values to Cloud1 using a decryption table. As used herein, "k" represents a number which instructs the cloud how many nearest neighbor points to retrieve. Cloud1 then returns one or more kNN rows to a client, who decrypts the one or more kNN rows to generate a final answer. Such a final answer can include the decrypted data points of k encrypted data points sent by the Cloud. The encryption scheme used to encrypt the data points can include 2DNF-sHE and any semantically-secure encryption scheme (such as, for example, the advanced encryption standard (AES)). While the 2DNF-sHE scheme can be used for distance-based decision evaluations, the other scheme(s) can be used, for example, for efficient data point decryption by the client. Additionally, decryption can be carried out, for example, over AES encrypted values.

As noted herein, however, conventional approaches utilizing kNN protocols face limitations with respect to 2DNF-sHE. For example, the steps of decrypting squared Euclidean distances and finding the k minimum distance row IDs of the protocol is inefficient with conventional approaches using 2DNF-sHE. Additionally, in connection with 2DNF-sHE, some conventional approaches employ a workaround whereby a pre-computed decryption table mapping plain text values to encrypted values is provided to Cloud2 for decryption. Because it is a map bounded by space requirements, only "v" chosen plain text values and respective encrypted values are added to the map. As used herein, "v" represents the number of mappings that are present in the decryption table, mapping plaintext values to the respective 2DNF-sHE encrypted values. Accordingly, such conventional approaches face challenges in using a limited-size decryption table for distance-based operations/algorithms.

As such, one or more embodiments of the invention include implementing Euclidean distance computations and a 2DNF formula. The Euclidean distance between two points is the length of the line segment connecting the two points. By way of illustration, if data point $p=(p_1, p_2, \ldots, p_n)$ and $q=(q_1, q_2, \ldots, q_n)$ are two points in an n-dimensional Euclidean space, then distance is given by following formula:

$$D=\sqrt{(p_1-q_1)^2+(p_2-q_2)^2+\ldots+(p_n-q_n)^2}$$

Additionally, square root computations can be complex operations to achieve with respect to secure encryption schemes. Therefore, secure systems can alternatively work with squared Euclidean distances ($D^2$), as follows:

$D^2=(p_1-q_1)^2+(p_2-q_2)^2+\ldots+(p_n-q_n)^2$, which is the same form as a 2DNF formula and can use a 2DNF-sHE scheme for secure distance-based analytics.

Also, at least one embodiment of the invention includes generating and/or implementing a storage mechanism for schemes built around 2DNF-sHE for distance-based analytics. Such an embodiment can include implementing storage at a Cloud platform. The Cloud can use a decryption table (DT), which maps plain text entries to encrypted values, and contains mappings of the first "v" plain text values. Often, the values chosen can be the first v values. However, a storage manager can choose the set of "v" plaintext value mappings that will most likely be used by the Cloud.

Such an embodiment as noted above includes encrypting and storing the same data point multiple times by progressively considering the point in decreasingly granularized Euclidean space (ES), while using the same instance of a 2DNF-sHE scheme for encryption. The granularity of the ES can be reduced, for example, in geometric progression; that is, ($Z^d$), ($Z^d$)/2, ($Z^d$)/4, ($Z^d$)/8, etc. As used herein, "$Z^d$" represents the expression used for the points (data points and query points); more specifically, "$Z^d$" represents that the "d" dimensional data point where each dimension is a natural number, wherein "Z" represents the natural number. Accordingly, in such an embodiment, the $D^2$ between points reduces progressively by ¼ from the earlier value, and thus, the same DT can be used for distance computations in a progressive ES, even if the DT was not able to be used in a previous ES (due to no value being found in the DT).

By way merely of illustration, consider the following storage example within the context of one or more embodiments of the invention. Specifically, consider a two-dimensional data points database (d=2), wherein the storage of (arbitrary) data point (1039, 629) can be carried out as follows. The database, with respect to ES $Z^2$ at the cloud platform, stores the 2DNF-sHE encrypted values of point (1039, 629). Additionally, the database, with respect to ES $Z^2/2$ at the Cloud platform, stores the 2DNF-sHE encrypted values of point (519, 314). Further, the database, with respect to ES $Z^2/4$ at the Cloud platform, stores the 2DNF-sHE encrypted values of point (259, 157). Also, one or more iterations of the above sequence can additionally be carried out, depending, for example, upon decisions made by a storage manager. As such, for a given plain text database, multiple encrypted databases can be stored at the Cloud platform.

By way of further illustration, consider the following query example within the context of one or more embodiments of the invention. Specifically, assume a DT containing mappings for the first 100,000 plain text values with the respective 2DNF-sHE encrypted values. The distance computation (that is, the squared Euclidean distance ($D^2$)) between two points in a storage model implemented via one or more embodiments of the invention can be carried out as follows for points (1039, 629), (13, 25). In ES $Z^2$, the Cloud platform computes the encrypted $D^2$ entry as $E(1026^2+604^2)$, which cannot be found in the given DT because $1026^2+604^2>100,000$. In ES $Z^2/2$, the Cloud platform computes the encrypted $D^2$ entry as $E(513^2+302^2)$, which similarly cannot be found in the given DT. In ES $Z^2/4$, the Cloud platform computes the encrypted $D^2$ entry as $E(256^2+151^2)$, which can be found in the given DT. The exact $D^2$ value perceived would be 4× (that is, an indexed plain value against $E(256^2+151^2)$. Because the Euclidean spaces are moved from fine-grained to coarser-grained, the respective distance value returned in the coarser-grained Euclidean spaces would be lesser than values returned in the fine-grained Euclidean spaces. Here, the perception term noted above is used with respect to the client, as the Cloud will not know the respective Euclidean space(s) with respect to the encrypted database.

FIG. 1 is a diagram illustrating system architecture, according to an embodiment of the invention. By way of illustration, FIG. 1 depicts query users 102 and a data owner 104 (which can include a database 106), which both interact and provide input to a secure proxy 108. The secure proxy 108 includes a user 110 which interacts with a storage manager 112. Additionally, the secure proxy 108 includes a data encryption engine 114, a key store 116, a query encryption engine 118, and a decryption engine 120. The storage manager 112 makes the decision regarding the size of the decryption table, the values that are added to the decryption table, and the number of databases to store with respect to the various Euclidean spaces. The data encryption engine 114 is a program component used to encrypt the data points. The key store 116 stores the keys used by the encryption scheme used to encrypt the data points/query points. The query encryption engine 118 is a program component used to encrypt the query points. Further, the decryption engine 120 decrypts the data points retrieved from the Cloud with respect to one or more queries.

As also depicted, the secure proxy 108 communicates (for example, over an Internet connection) with a cloud platform 122, which contains a decryption table 124, a set of encrypted databases 126 corresponding to various ES designations, and an evaluation engine 128. The evaluation engine 128 performs the evaluation of $D^2$ for the data points with respect to data points using the 2DNF-sHE homomorphic properties of the encryption scheme.

By way of illustration, consider the following example implementation of an embodiment of the invention in connection with a secure kNN context. Such an example embodiment can include fixing the size of the decryption table (such as DT 124 in FIG. 1). For example, assume that the decryption table will store approximately 1,000,000 entries (square Euclidean distance values); that is, distance values up to 1,000 units can be decrypted by Cloud2. Assuming a two-dimensional working space, such an example embodiment of the invention can include storing the data point (x, y) multiple times in multiple databases with respect to Euclidean spaces $(Z^d)$, $(Z^d)/2$, $(Z^d)/4$, $(Z^d)/8$, etc.

Additionally, in such an example, kNN for query point "q" can be carried out as follows. A table storing points with respect to ES $(Z^d)$ will be used for kNN if k points exists within 1,000 units from q. A table storing points with respect to ES $(Z^d)/2$ will be used for kNN if k points exists within 2,000 units from q. Additionally, a table storing points with respect to ES $(Z^d)/4$ will be used for kNN if k points exists within 4,000 units from q. Also, additional iterations can be carried out as necessary and/or desired.

Figure 2:
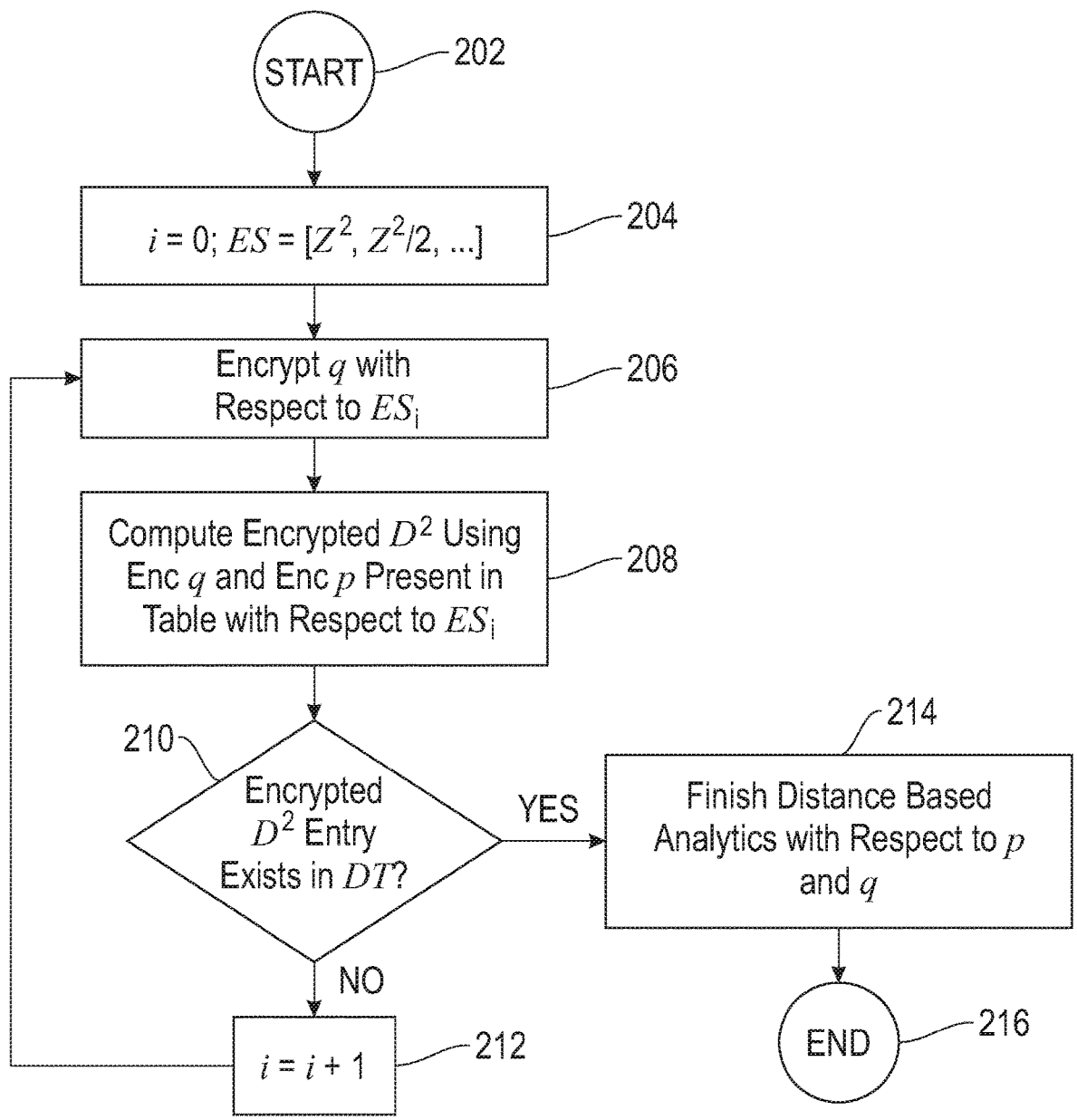
FIG. 2 is a flow diagram illustrating techniques according to an embodiment of the invention.

FIG. 2 is a flow diagram illustrating techniques according to an embodiment of the present invention. Step 202 includes starting the sequence. Step 204 includes establishing ES parameters (such as, for example, i=0 and ES=[$Z^2$, $Z^2/2$, . . . ]). Step 206 includes encrypting query point (q) with respect to $ES_i$. Step 208 includes computing an encrypted squared Euclidean distance ($D^2$)) value using encrypted query point (q) (Enc q) and encrypted data point (p) (Enc p) present in a data table with respect to $ES_i$. Step 210 includes determining whether the encrypted $D^2$ entry exists in the decryption table. If no (that is, the encrypted $D^2$ entry does not exist in the decryption table), step 212 includes establishing new parameters (for example, i=i+1) and returning to step 206. If yes (that is, the encrypted $D^2$ entry exists in the decryption table), step 214 includes completing distance-based analytics with respect to data point p and query point q. Further, as depicted, step 216 includes ending the sequence.

Accordingly, at least one embodiment of the invention includes generating and/or implementing a storage mechanism that is adopted for storing encrypted data multiple times; that is, the same point is stored with respect to multiple Euclidean spaces (such as $Z^d$, $Z^d/2$, $Z^d/4$, $Z^d/8$, etc.) in multiple tables. Such an embodiment, as detailed herein, can assume the use of a decryption table of 2DNF-sHE encrypted values that stores a mapping of the first "v" plain text values and the corresponding encryptions.

Therefore, for a given query point "q" and a data point "p," the distance analysis carried out by a Cloud can proceed as follows. If the squared Euclidean distance ($D^2$)) value lies between 0 and v, then the storage mechanism under ES $Z^d$ is used for the distance calculation between q and p. If $D^2$ lies between v and 4v, then the storage mechanism under ES $Z^d$ cannot be used for distance evaluations because the encrypted $D^2$ map entry will not be present in the DT. Accordingly, the storage mechanism under ES $Z^d/2$ will be used for such distance calculations, as the effective distance value in ES $Z^d/2$ will be one-fourth of the actual distance value. Similarly, the storage mechanism under ES $Z^d/4$ will be used when $D^2$ lies between 4v and 16v, the storage mechanism under ES $Z^d/8$ will be used when $D^2$ lies between 16v and 64v, etc.

Figure 3:
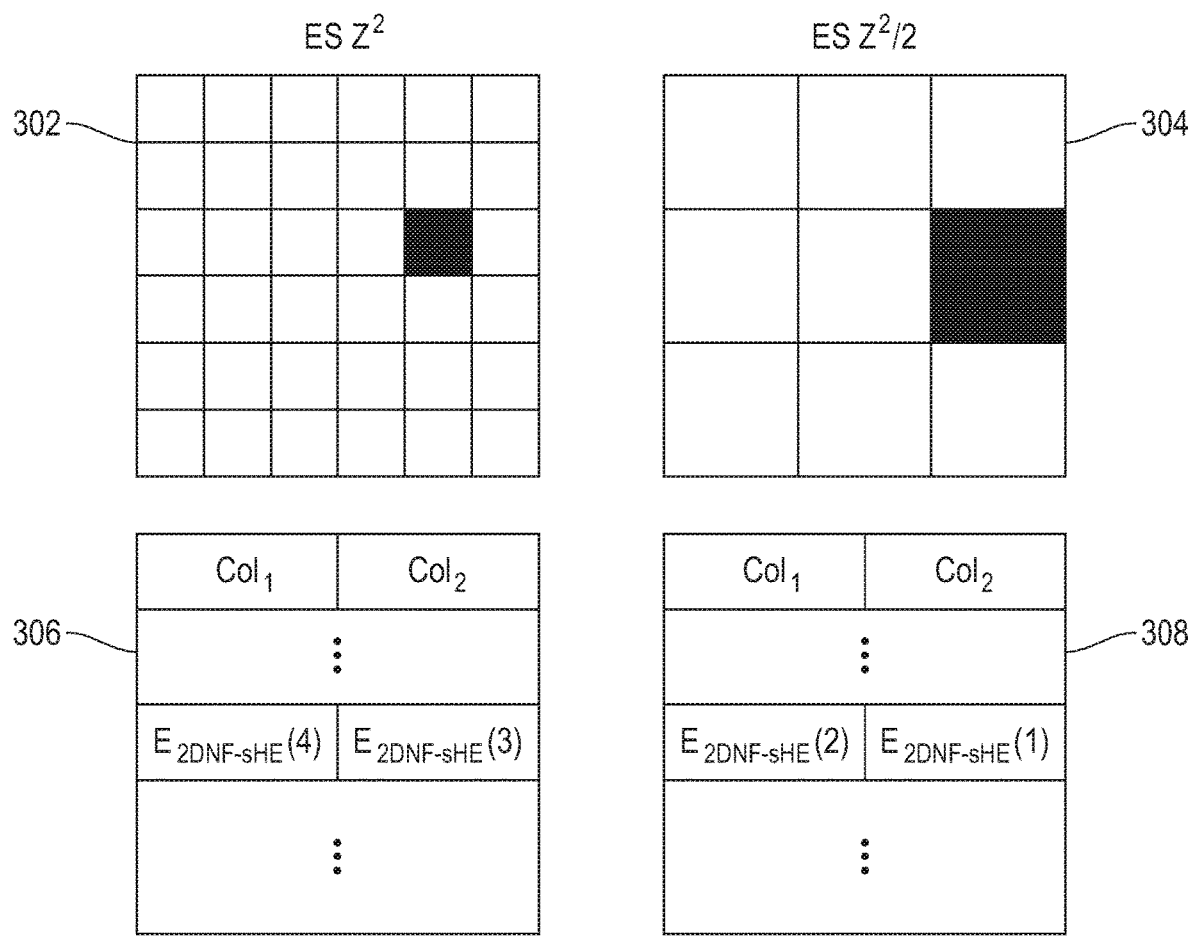
FIG. 3 is a diagram illustrating example data point views and storage tables, according to an exemplary embodiment of the invention.

FIG. 3 is a diagram illustrating example data point views and storage tables, according to an exemplary embodiment of the invention. By way of illustration, FIG. 3 depicts an example data points view 302 for two-dimensional (2D) point (4,3) in ES $Z^2$, and an example data points view 304 for 2D point (4,3) in ES $Z^2/2$. Additionally, FIG. 3 depicts an example storage table 306 with respect to encrypted data for point (4,3) in connection with ES $Z^2$, and an example storage table 308 with respect to encrypted data for point (4,3) in connection with ES $Z^2/2$.

Figure 4:
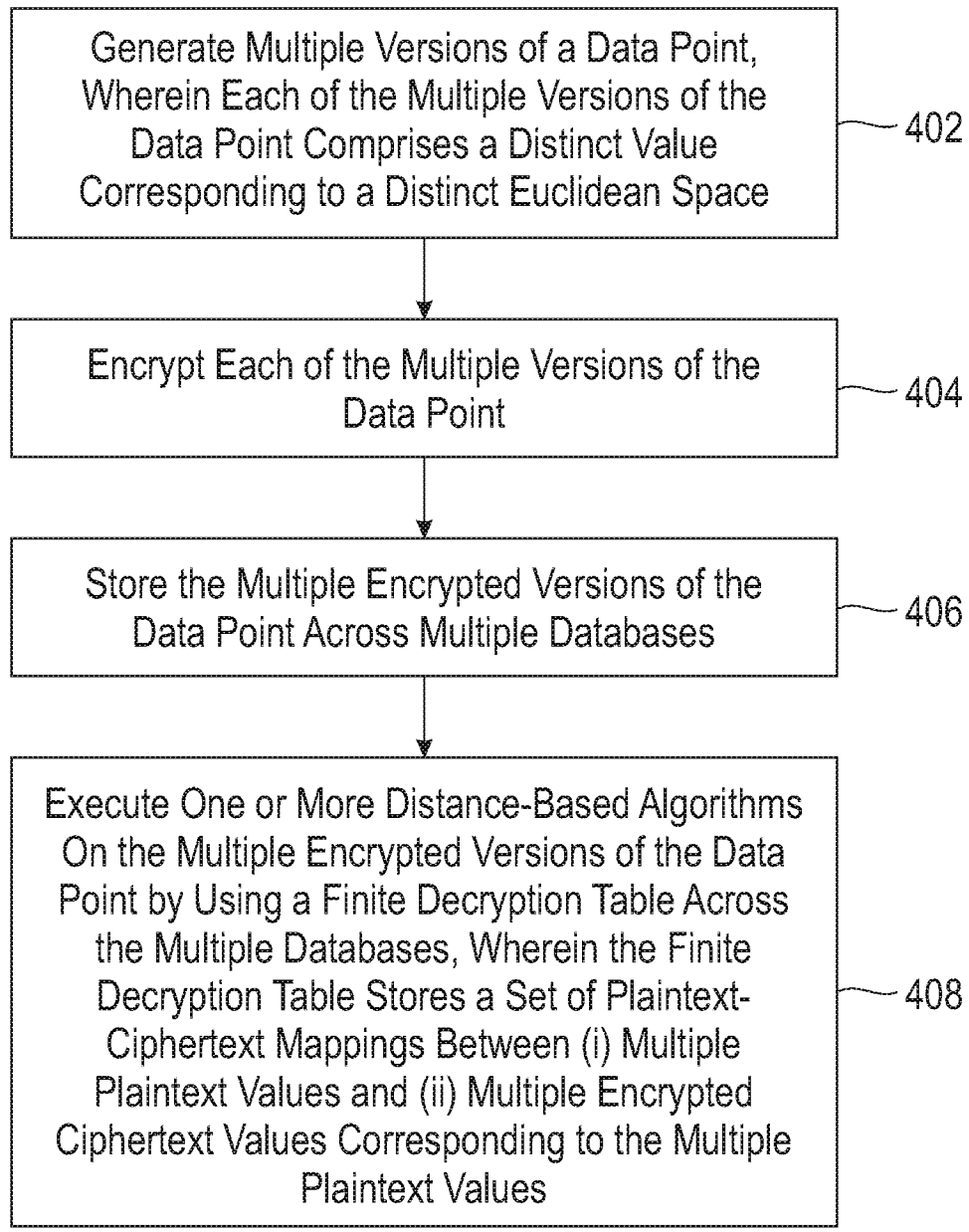
FIG. 4 is a flow diagram illustrating techniques according to an embodiment of the invention.

FIG. 4 is a flow diagram illustrating techniques according to an embodiment of the present invention. Step 402 includes generating multiple versions of a data point, wherein each of the multiple versions of the data point comprises a distinct value corresponding to a distinct Euclidean space. Each of the multiple versions of the data point can include a distinct value corresponding to a distinct Euclidean space that is a coarser-grained Euclidean space than the preceding version of the data point. Additionally, generating the multiple versions of the data point can include dividing, repeatedly over one or more iterations, the value of a given version of the data point by a predetermined number (for example, two).

Step 404 includes encrypting each of the multiple versions of the data point. Encrypting can include encrypting each of the multiple versions of the data point using a disjunctive normal form homomorphic semantically secure encryption (2DNF-sHE) scheme. Step 406 includes storing the multiple encrypted versions of the data point across multiple databases.

Step 408 includes executing one or more distance-based algorithms on the multiple encrypted versions of the data point by using a finite decryption table across the multiple databases, wherein the finite decryption table stores a set of plaintext-ciphertext mappings between (i) multiple plaintext values and (ii) multiple encrypted ciphertext values corresponding to the multiple plaintext values. The finite decryption table can include a decryption table limited to a finite set of values. Also, the multiple encrypted ciphertext values can include multiple 2DNF-encrypted ciphertext values, and the multiple plaintext values can be selected by a storage manager.

Additionally, executing the one or more distance-based algorithms on the multiple encrypted versions of the data point can include executing the one or more distance-based algorithms on the multiple encrypted versions of the data point using a 2DNF-sHE scheme. Further, the one or more distance-based algorithms can include a k-nearest neighbors algorithm, a k-means clustering algorithm, etc.

Also, in one or more embodiments of the invention, the multiple databases and/or the finite decryption table can be stored on a cloud platform Also, an additional embodiment of the invention includes generating multiple versions of a data point in a sequential order, wherein each of the multiple versions of the data point comprises a distinct value corresponding to a distinct Euclidean space that is decreasingly granular in comparison to the distinct Euclidean space corresponding to the preceding version of the data point in the sequential order. Additionally, such an embodiment can include encrypting each of the multiple versions of the data point, generating a storage mechanism comprising multiple databases, wherein the storage mechanism is compatible with disjunctive normal form homomorphic semantically secure encryption (2DNF-sHE) schemes, and storing the multiple encrypted versions of the data point across the multiple databases. Further, such an embodiment can also include executing one or more distance-based algorithms on the multiple encrypted versions of the data point by using a decryption table across the multiple databases, wherein the decryption table comprises a decryption table limited to a finite set of values, and wherein the decryption table stores a set of plaintext-ciphertext mappings between (i) multiple plaintext values and (ii) multiple encrypted ciphertext values corresponding to the multiple plaintext values.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
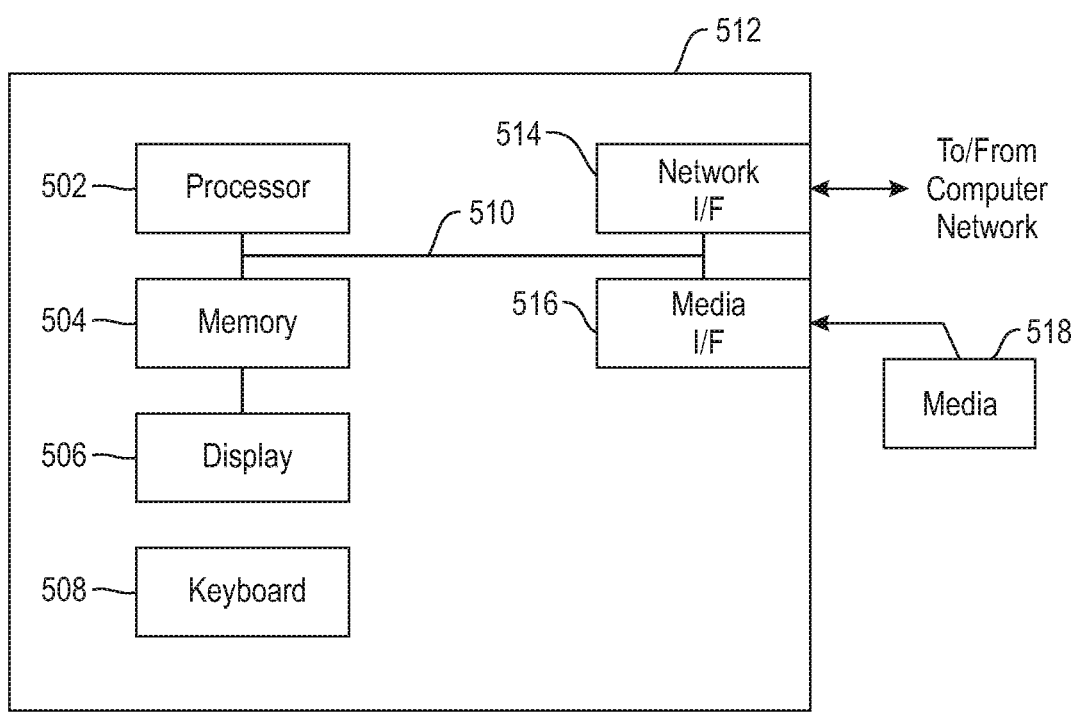
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
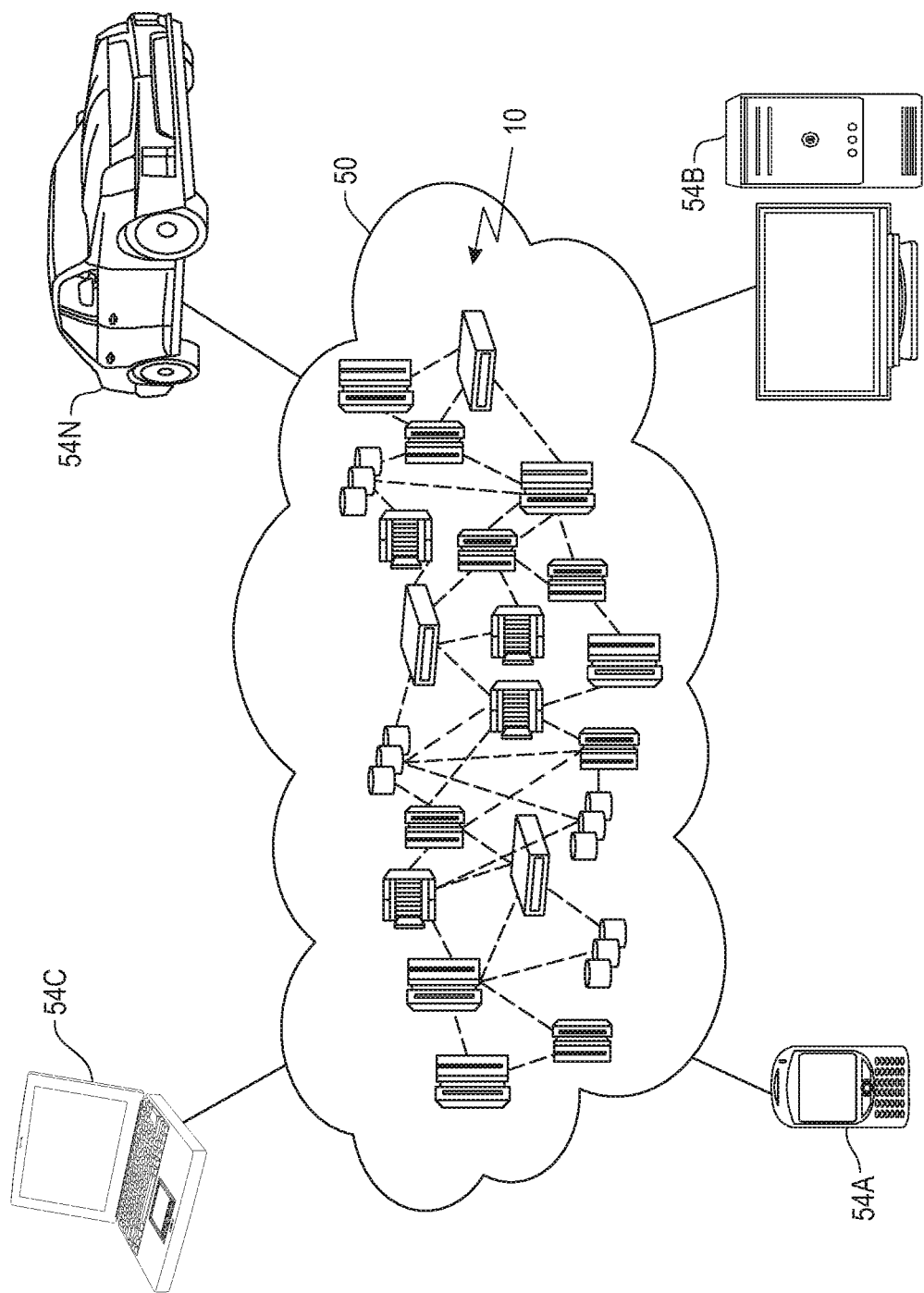
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
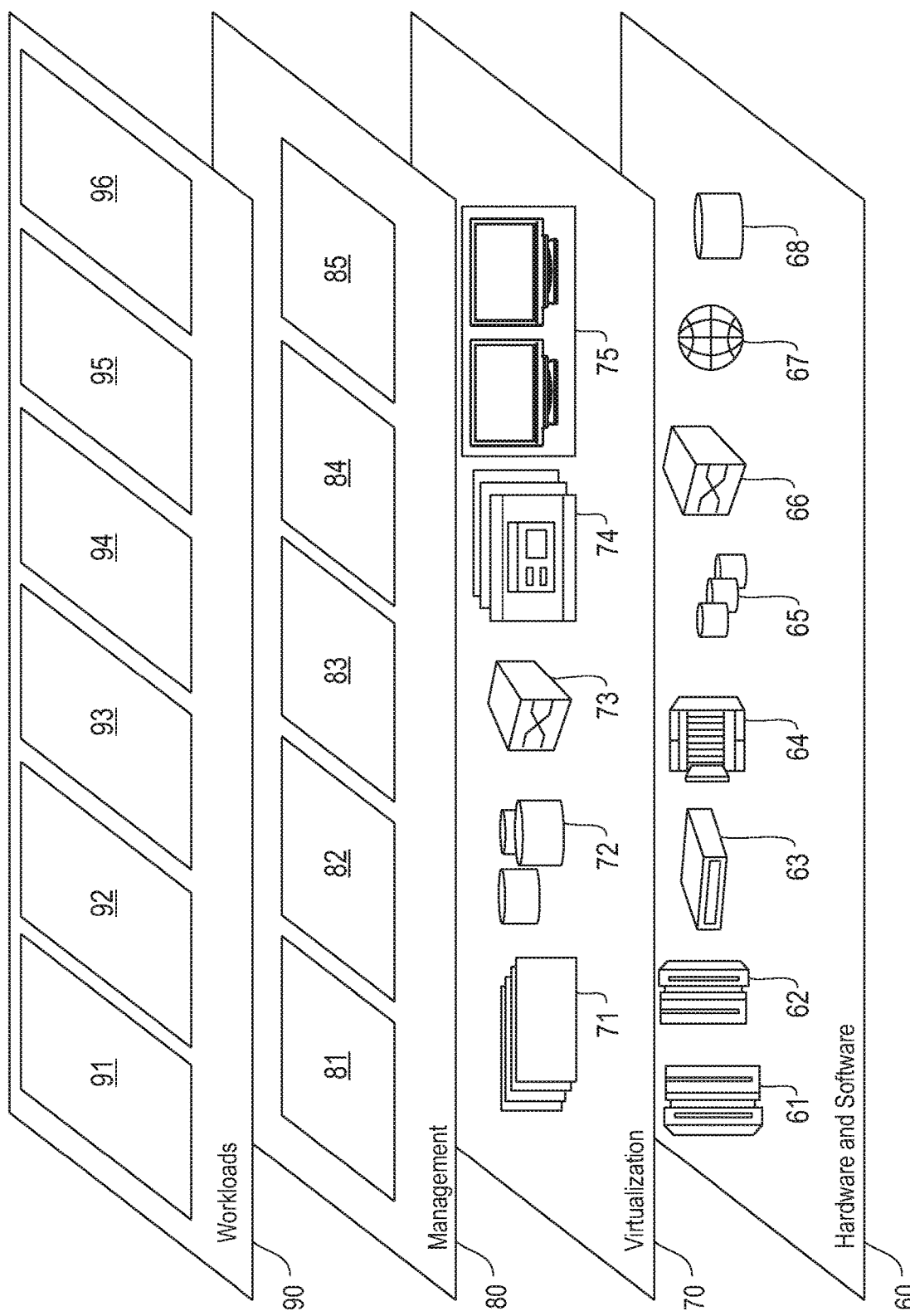
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encrypted data storage 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, performing distance-based analytics using a 2DNF-sHE scheme to store encrypted data multiple times in multiple databases using small decryption tables.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
generating multiple versions of a data point, wherein each of the multiple versions of the data point comprises a distinct value corresponding to a distinct Euclidean space;
encrypting each of the multiple versions of the data point;
storing the multiple encrypted versions of the data point across multiple databases; and
executing one or more distance-based algorithms on the multiple encrypted versions of the data point by using a finite decryption table across the multiple databases, wherein the finite decryption table stores a set of plaintext-ciphertext mappings between (i) multiple plaintext values and (ii) multiple encrypted ciphertext values corresponding to the multiple plaintext values;
wherein the steps are carried out by at least one computing device.

2. The computer-implemented method of claim 1, wherein the multiple encrypted ciphertext values comprise multiple 2DNF-encrypted ciphertext values.

3. The computer-implemented method of claim 1, wherein the multiple plaintext values are selected by a storage manager.

4. The computer-implemented method of claim 1, wherein each of the multiple versions of the data point comprises a distinct value corresponding to a distinct Euclidean space that is a coarser-grained Euclidean space than a preceding version of the data point.

5. The computer-implemented method of claim 1, wherein said generating the multiple versions of the data point comprises dividing, repeatedly over one or more iterations, the value of a given version of the data point by a pre-determined number.

6. The computer-implemented method of claim 1, wherein said encrypting comprises encrypting each of the multiple versions of the data point using a disjunctive normal form homomorphic semantically secure encryption (2DNF-sHE) scheme.

7. The computer-implemented method of claim 1, wherein the multiple databases are stored on a cloud platform.

8. The computer-implemented method of claim 1, wherein said executing the one or more distance-based algorithms on the multiple encrypted versions of the data point comprises executing the one or more distance-based algorithms on the multiple encrypted versions of the data point using a disjunctive normal form homomorphic semantically secure encryption (2DNF-sHE) scheme.

9. The computer-implemented method of claim 1, wherein the one or more distance-based algorithms comprises a k-nearest neighbors algorithm.

10. The computer-implemented method of claim 1, wherein the one or more distance-based algorithms comprises a k-means clustering algorithm.

11. The computer-implemented method of claim 1, wherein the finite decryption table is stored on a cloud platform.

12. A computer program product comprising a non-transitory computer readable storage medium having program instructions embodied therewith, the program instructions executable by a computing device to cause the computing device to:
generate multiple versions of a data point, wherein each of the multiple versions of the data point comprises a distinct value corresponding to a distinct Euclidean space;
encrypt each of the multiple versions of the data point;
storing the multiple encrypted versions of the data point across multiple databases;
and execute one or more distance-based algorithms on the multiple encrypted versions of the data point by using a finite decryption table across the multiple databases, wherein the finite decryption table stores a set of plaintext-ciphertext mappings between (i) multiple plaintext values and (ii) multiple encrypted ciphertext values corresponding to the multiple plaintext values.

13. The computer program product of claim 12, wherein said generating the multiple versions of the data point comprises dividing, repeatedly over one or more iterations, the value of a given version of the data point by a predetermined number.

14. The computer program product of claim 12, wherein said encrypting comprises encrypting each of the multiple versions of the data point using a disjunctive normal form homomorphic semantically secure encryption (2DNF-sHE) scheme.

15. The computer program product of claim 12, wherein said executing the one or more distance-based algorithms on the multiple encrypted versions of the data point comprises executing the one or more distance-based algorithms on the multiple encrypted versions of the data point using a disjunctive normal form homomorphic semantically secure encryption (2DNF-sHE) scheme.

16. The computer program product of claim 12, wherein the one or more distance-based algorithms comprises a k-nearest neighbors algorithm.

17. The computer program product of claim 12, wherein the one or more distance-based algorithms comprises a k-means clustering algorithm.

18. The computer program product of claim 12, wherein the multiple encrypted ciphertext values comprise multiple 2DNF-encrypted ciphertext values.

19. A system comprising:
a memory; and
at least one processor operably coupled to the memory and configured for:
generating multiple versions of a data point, wherein each of the multiple versions of the data point comprises a distinct value corresponding to a distinct Euclidean space;
encrypting each of the multiple versions of the data point;
storing the multiple encrypted versions of the data point across multiple databases; and
executing one or more distance-based algorithms on the multiple encrypted versions of the data point by using a finite decryption table across the multiple databases, wherein the finite decryption table stores a set of plaintext-ciphertext mappings between (i) multiple plaintext values and (ii) multiple encrypted ciphertext values corresponding to the multiple plaintext values.

20. A computer-implemented method, the method comprising steps of:
generating multiple versions of a data point in a sequential order, wherein each of the multiple versions of the data point comprises a distinct value corresponding to a distinct Euclidean space that is decreasingly granular in comparison to the distinct Euclidean space corresponding to the preceding version of the data point in the sequential order;
encrypting each of the multiple versions of the data point;
generating a storage mechanism comprising multiple databases, wherein the storage mechanism is compatible with disjunctive normal form homomorphic semantically secure encryption (2DNF-sHE) schemes;
storing the multiple encrypted versions of the data point across the multiple databases; and
executing one or more distance-based algorithms on the multiple encrypted versions of the data point by using a decryption table across the multiple databases, wherein the decryption table comprises a decryption table limited to a finite set of values, and wherein the decryption table stores a set of plaintext-ciphertext mappings between (i) multiple plaintext values and (ii) multiple encrypted ciphertext values corresponding to the multiple plaintext values;
wherein the steps are carried out by at least one computing device.

* * * * *